United States Patent [19]

Lu et al.

[11] Patent Number: 5,072,110

[45] Date of Patent: Dec. 10, 1991

[54] FIBER OPTIC STRAIN AND IMPACT SENSOR SYSTEM FOR COMPOSITE MATERIALS

[75] Inventors: Zhuo J. Lu, Pierrefonds; Franz A. Blaha, Mount Royal, both of Canada

[73] Assignee: Canadian Marconi Company, Montreal, Canada

[21] Appl. No.: 511,441

[22] Filed: Apr. 19, 1990

[30] Foreign Application Priority Data

Sep. 5, 1989 [CA] Canada .................................. 610319

[51] Int. Cl.$^5$ .............................................. H01J 5/16
[52] U.S. Cl. ........................... 250/227.14; 250/227.16
[58] Field of Search ...................... 250/227.14, 227.15, 250/227.16; 356/33, 34, 35.5, 73.1; 73/768

[56] References Cited

U.S. PATENT DOCUMENTS

| | | | |
|---|---|---|---|
| 3,350,926 | 11/1967 | Webb | 73/768 |
| 3,779,071 | 12/1973 | Thomas, Jr. et al. | 73/768 |
| 3,786,681 | 1/1974 | Kiehn | 356/33 |
| 4,563,087 | 1/1986 | Bourbin et al. | 356/73.1 |
| 4,603,252 | 7/1986 | Malek et al. | 73/800 |
| 4,636,638 | 1/1987 | Huang et al. | 356/32 |
| 4,638,153 | 1/1987 | Dakin | 250/227.14 |
| 4,751,690 | 6/1988 | Krueger | 73/800 |
| 4,772,092 | 9/1988 | Hofer et al. | 350/96.24 |
| 4,773,753 | 9/1988 | Hirose et al. | 356/35.5 |
| 4,781,056 | 11/1988 | Noel et al. | 73/800 |
| 4,836,030 | 6/1989 | Martin | 73/800 |
| 4,891,512 | 1/1990 | Naden | 250/227.14 |
| 4,918,305 | 4/1990 | Wlodarczyk et al. | 250/227.14 |
| 4,928,004 | 5/1990 | Zimmermann et al. | 250/227.14 |
| 4,936,649 | 6/1990 | Lymer et al. | 250/227.14 |
| 4,950,886 | 8/1990 | Claus et al. | 250/227.14 |

OTHER PUBLICATIONS

"Use of Highly Elliptical Core Fibers for Two-Mode Fiber Devices", by Kim et al, Optics Letters, Sep. 1987, vol. 12, No. 9, pp. 729 et seq.

"Elliptical Core Two-Mode Fiber Strain Gauge", by Blake et al, in SPIE vol. 838, Fiber Optic and Laser Sensors V (1987), pp. 332 et seq.

*Primary Examiner*—David C. Nelms
*Assistant Examiner*—S. B. Allen
*Attorney, Agent, or Firm*—Fishman, Dionne & Cantor

[57] ABSTRACT

An elliptical core fiber has a first end and a second end, the second end comprising a mirrored surface. An in-line polarizer is formed along the elliptical core fiber, and the first end is connected to a single-mode optpical fiber by a misaligned splice. Sensors of this nature are formed in a grid and detect acoustic emissions which are caused by breaks in the composite material.

10 Claims, 2 Drawing Sheets

PMC — Polarization Maintaining Connector

PMF — Single-Mode Polarization Maintaining Fiber
ECF — Two-Mode Elliptical Core Fiber
SMF — Single-Mode Fiber PMC — Polarization Maintaining Connector

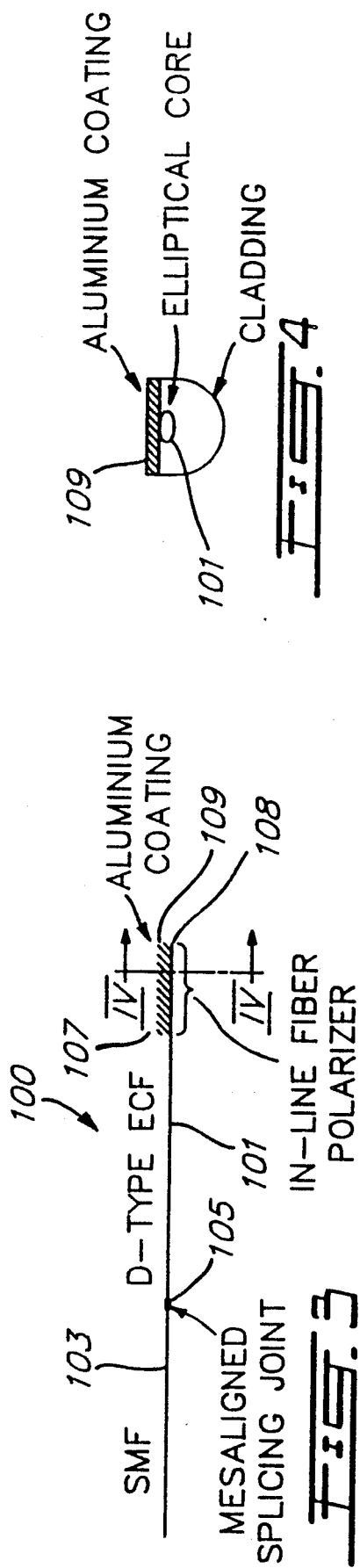
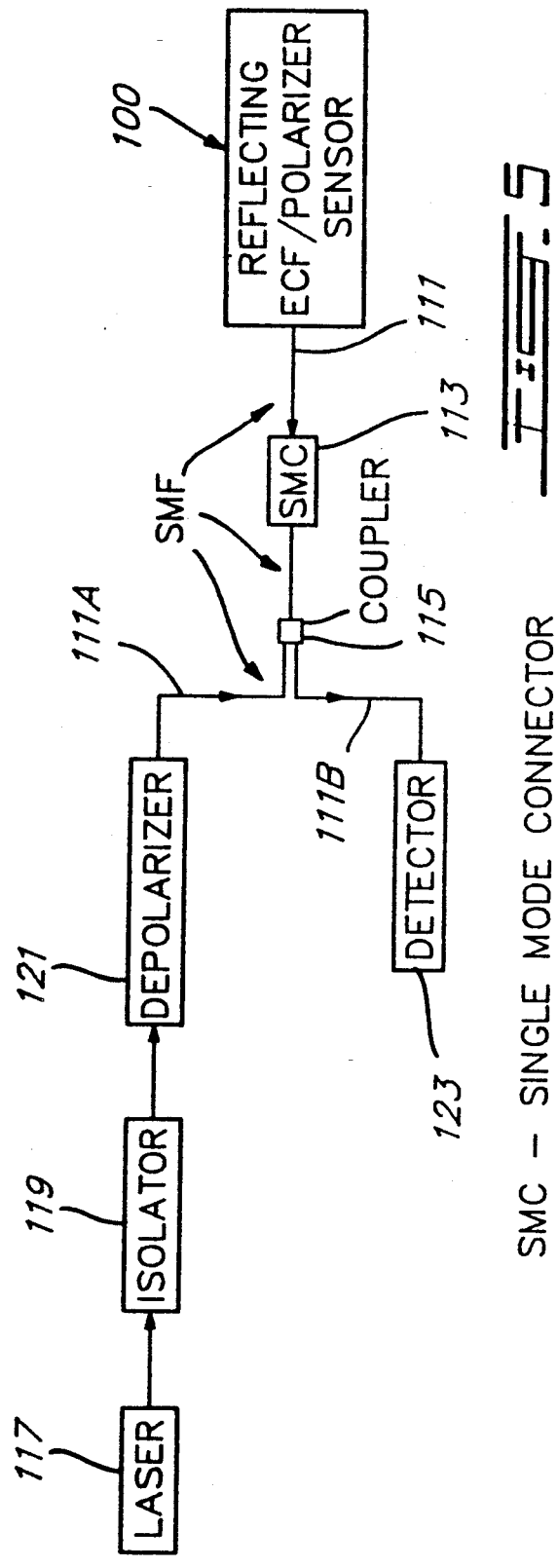

FIBER OPTIC STRAIN AND IMPACT SENSOR SYSTEM FOR COMPOSITE MATERIALS

BACKGROUND OF INVENTION

1. Field of the Invention

The invention relates to a method for detecting acoustic waves in a composite material using fiber optic sensors. The invention also relates to a novel sensor and system for detecting the acoustic waves.

2. Description of Prior Art

It is known in the prior art to embed sensors in composite materials to determine internal stresses and breakages of the fibers or layers forming the composite materials. U.S. Pat. No. 3,350,926 teaches stress transducers 10 which are embedded in materials (see FIGS. 4 and 5) so that they may detect internal stresses. The transducers are semiconductive piezoresistive elements mounted in housings. U.S. Pat. No. 3,779,071 teaches the use of conductive fibers (e.g. graphite fibers) embedded in a plied material. The resistance of the fibers is monitored to determine changes in the plied material.

U.S. Pat. No. 4,772,092 teaches the use of light fibers embedded in a laminated material. Light is coupled to the input side of the fibers and is detected at the output side of each fiber. When the material cracks, fibers adjacent to the material will also crack and break. Accordingly, light applied to the input of such broken fibers will either not reach the output or will reach the output with a far lesser intensity. Accordingly, by detecting a decrease in intensity at the light output, it is possible to determine the position of cracks in the composite material. U.S. Pat. No. 4,836,030 teaches a like method employed in aircraft skin laminated materials. Once again, a decrease in light intensity indicates cracks at the position of the fibers which show this decrease.

In U.S. Pat. No. 4,781,056, at least one optical fiber is arranged to form a network, and light is emitted into one end and received out of the other end of the network. The network is embedded in a composite material. The light intensity transmitted provides information concerning the presence of strain which is used for weight detection (a scale).

In U.S. Pat. No. 4,603,252, optical fibers are embedded in laminated materials in regular patterns, and light transmitted through the fibers is monitored for changes in the patterns and for cracks. In U.S. Pat. No. 4,636,638, a strain responsive device includes an optical fiber 20, and spaced strain responsive devices 22 bonded to the optical fiber.

In the above systems, a break in the composite material will be detected only if a fiber is present at one location of the break, and the fiber is also broken. Accordingly, the fibers must be arranged in a grid throughout the monitored material (as shown, for example, in the '252 and '056 patents). To provide adequate monitoring, the spacing between fibers has to be of the order of 1 inch, i.e. a very dense grid is needed.

With respect to the patents using optical fibers, it is noted that they detect only cracks and breakages, and they provide information only when the optical fiber is broken.

It is also known to detect acoustic waves in water with fiber optic sensors. U.S. Pat. No. 4,751,690 teaches a fiber optic interferometric hydrofoam which uses optical fibers on the top and bottom of bending beams. The top and bottom fibers form, in effect, the two arms of an interferometer. In an embodiment illustrated in FIG. 6 of the patent, the free ends of the optical fibers are mirrored.

It is also known in the art to use elliptical core fibers for interferometric measurements. The two spatial modes of the elliptical core fibers are employed as the two arms of the interferometer. For example, see "Use of Highly Elliptical Core Fibers for Two-Mode Fiber Devices" by Kim et al, Optics Letters, September 1987, Vol. 12, No. 9, p 729 et seq. and "Elliptical Core Two-Mode Fiber Strain Gauge" by Blake et al, in SPIE Vol. 838, Fiber Optic and Laser Sensors V (1987), pages 332 et seq. U.S. Pat. No. 4,773,753 teaches a fiber optic sensor having circular cores and elliptical clads surrounding the cores.

It is also known that acoustic emissions are caused by the delamination and breakage of fibers in composite materials.

SUMMARY OF INVENTION

It is an object of the invention to provide a method of detecting the acoustic emissions caused by the delamination and breakage of fibers in composite materials by using fiber optic interferometric sensors.

It is a further object of the invention to provide a novel sensor for use in the above method.

In accordance with the invention, elliptical core fibers are embedded in the composite materials. A light source is applied to the fibers, and a light output from the fibers is applied to a detector. Because the acoustic emissions cause changes in the characteristics of the optical fibers (index of refraction or length), the sensed output in the presence of such emissions will be reflected in the input to the detectors.

The novel sensor, in accordance with the invention, comprises a two-mode elliptical core fiber having a first end and a second end. In one embodiment, coherent light is transmitted from the first end of the two-mode elliptical core fiber and detected at the second end thereof. In a second embodiment, the second end of the two-mode elliptical core fiber is a mirrored surface, and coherent light is transmitted from the one end and detected at the one end.

BRIEF DESCRIPTION OF DRAWINGS

The invention will be better understood by an examination of the following description, together with the accompanying drawings, in which:

FIG. 3 is a conceptual diagram of the novel sensor in accordance with the invention;

FIG. 4 is a cross-section through IV—IV of FIG. 3; and

FIG. 5 illustrates a sensor system using the novel sensor of FIG. 3.

DESCRIPTION OF PREFERRED EMBODIMENTS

Figure 1:
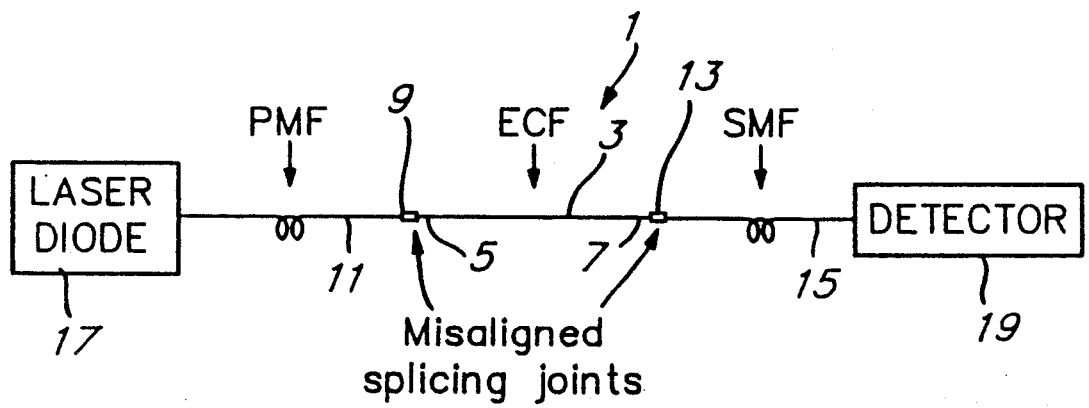
FIG. 1 is a conceptual diagram of an elliptical core two-mode fiber sensor.

Referring to FIG. 1, a sensor 1 in accordance with the invention comprises a two-mode elliptical core fiber 3 having an input end 5 and an output end 7. The input end 5 of the elliptical core fiber 3 is connected, via a misaligned spliced joint 9, to a single-mode polarization maintaining fiber 11. The output end 7 of the elliptical core fiber is connected, via a misaligned spliced joint 13, to a single-mode fiber 15. The free end of the polarization maintaining fiber 11 is connected to a coherent light source, for example, a temperature stabilized laser diode. The free end of the single-mode fiber 15 is connected to a detector 19.

As known in the art, the sensor 1 behaves like a two-arm interferometer and its power transfer characteristics can be expressed as:

$$P_{out} = CP_{in}(1 + \cos\phi) \qquad (1)$$

where $$\phi = \Delta\beta L = \frac{2\pi}{Z_b} L \qquad (2)$$

where
$P_{out}$ = the output power of the sensor
$P_{in}$ = the input power
$\phi$ = the accumulated phase difference between the light travelling along the two modes
$\Delta\beta$ = the difference between the propagation constants of the two modes
$L$ = the length of the fiber
$Z_b$ = the fiber beatlength between the two modes
$C$ = a constant related to the loss of the sensor.

The concept of the sensor is based on monitoring $\phi$, the phase change of the sensor, from which the corresponding changes in $L$ or $\Delta\beta$ can be determined.

An impact which induces damage emits acoustic signals which are characteristically different from an impact which does not induce damage. Therefore, when monitoring the impact with the sensitive fiber optic sensor, the occurrence of impact damage can be detected. For this reason, when impact damage has occurred in a composite material structure, loading the structure will induce the emission of characteristic acoustic signals from the damaged area. In the prior art, the signals were detected with electronic microphones. In accordance with the invention embedded fiber optic sensors of the the above described, and embedded fiber optic sensors as illustrated in FIG. 3 hereof, are used for the detection of the signals and the signals emitted from the actual impact.

Figure 2:
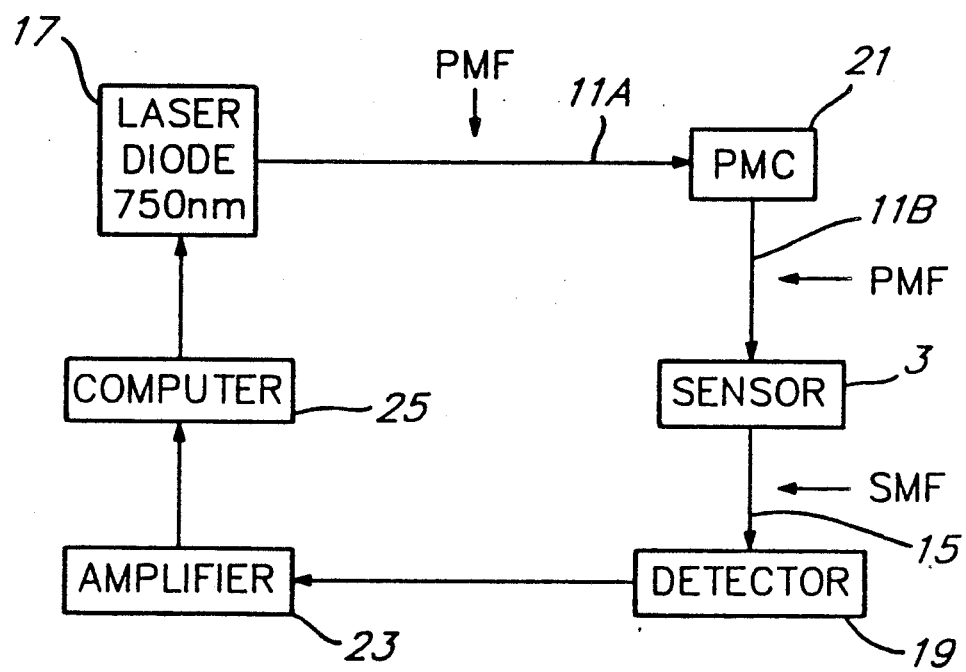
FIG. 2 illustrates a fiber optic sensor system for composite materials.

FIG. 2 illustrates a system for carrying out the method in accordance with the invention. The output of the laser diode 17 is fed to a first single-mode polarization maintaining fiber 11A which is connected to a second single-mode polarization maintaining fiber 11B via polarization maintaining connector 21. The free end of 11B is connected to one end of an elliptical core fiber 3, whose other end is connected to one end of a single-mode fiber 15, as illustrated in FIG. 1. Once again, the second end of the single-mode fiber is connected to a detector 19, and the output of the detector is connected to amplifier 23. The output of the amplifier is connected to computer 25, and the output of the computer is fed back to the light source 17 for making adjustments as will be discussed below.

Although FIG. 2 illustrates only a single sensor 3 connected to the light source 17, in actual practice, each light source will be connected to a multiplicity of such sensors. In turn, the output of a multiplicity of sensors may be connected to the single computer. The sensors will, of course, all be embedded in the composite material. The computer will analyze the data output from the sensor or sensors and it will also control the operation of the system.

The detection concept is based on measuring the acoustic waves propagating in the composite materials. The acoustic waves induce phase changes in the sensor output signal, and the signatures of the acoustic waves can be used to determine damages in the composite material.

Due to the cosine response of the sensor shown in equation (1), the sensitivy of the sensor varies with its initial phase. From equation (1), one can derive the sensitivity as:

$$\frac{dP_{out}}{d\phi} = -CP_{in}\sin\phi$$

The above equation indicates that the maximum sensitivity of the sensor can be obtained by adjusting the initial phase of the sensor signal to $$\phi_o = N\frac{\pi}{2},$$

where N is an odd integer. The initial phase of the sensor is also a function of wavelength as follows:

$$\phi_o = \frac{2\pi}{\lambda} \Delta n L \qquad (4)$$

and $$d\phi_o = \phi_o \frac{d\lambda}{\lambda} \qquad (5)$$

where
$\lambda$ = the wavelength of the light source
$\Delta n$ = the difference between the effective refractive indices of the two modes.

If N is relatively large, e.g. N is of the order of 7000, the initial phase of the sensor signal can be changed by slightly adjusting (within 0.5 nm) the wavelength of the laser diode. This phase adjustment is performed for each sensor in the system by changing the operating current of the laser diode through computer 25.

FIGS. 3 and 4 illustrate an alternative sensor arrangement. The sensor arrangement 100 comprises an elliptical core fiber 101 having one end connected to a single-mode fiber 103 through a misaligned splicing joint 105. The elliptical core fiber 101 is a D-type, and a part 107 of the elliptical core fiber forms an in-line polarizer which is fabricated by first etching the fiber in hydrofluoric acid and then coating it with an aluminium coating 109. Although the polarizer is shown formed at one end of the fiber 101, it will be clear that it can be formed anywhere along fiber 101. The free end 108 of the elliptical core fiber is also coated with aluminium to form a reflecting mirror. The effective length of the elliptical core fiber sensor and polarizer are doubled because of this mirror.

FIG. 5 illustrates a system using the sensor of FIGS. 3 and 4. In FIG. 5, the sensor 100 has its free end connected to a single-mode fiber 111. For connection to the system, the single-mode fiber 111 has its free end connected to the output of a single-mode connector 113. Single-mode fibers 111A and 111B form a coupler 115, and the free end of the coupler 115 is connected to the input of the single-mode connector 113.

A light source 117, for example, a laser, has its output connected to an isolator 119. The output of the isolator 119 is fed to a depolarizer 121 whose output is connected to the single-mode fibers 111A. The free end of the single-mode fiber 111B is connected to the input of detector 123. Light emitted from the light source 117 is transmitted, via the single-mode fibers 111A and the single-mode connector 113 and the single-mode fiber 111 to the sensor 100. Light reflected from the mirrored surface at the free end of the sensor 100 is transmitted, via single-mode fiber 111 and single-mode connector 113 and single-mode fiber 111B to the detector 123. The reflected light will be prevented from returning to the laser by the isolator 119.

In accordance with the method of the invention, at least one sensor, comprising an elliptical core fiber, is embedded in a composite material. The light from a coherent light source is transmitted to the sensor, and the sensor, in turn, transmits light to a detector. Under normal conditions, there is a predetermined phase difference between the two modes in the elliptical core fiber. When acoustic emissions are caused by the delamination or breakage of fibers in the composite material, the emissions will induce phase changes in the elliptical core fibers so that the difference in phase between the two modes in the elliptical core fiber is varied. This variation of the difference in phase is detected to thereby determine signature noises associated with different damage, so that the type of damage which effects the composite material can be determined.

As the acoustic signals are emitted for some distance, the embedded grid of optical fibers does not have to be as dense as prior art grids, and spacing between fibers of up to a foot are feasible.

Although several embodiments have been described, this was for the purpose of illustrating, but not limiting, the invention. Various modifications, which will come readily to the mind of one skilled in the art, are within the scope of the invention as defined in the appended claims.

We claim:

1. A signal sensing system for sensing changes in acoustic signals resulting from damage inducing impact on a composite material structure, comprising;
    a plurality of fiber optic sensors embedded in said structure;
    each said fiber optic sensor comprising a two-mode elliptical core optical fiber;
    a source of coherent light;
    means for directing light from said source of coherent light to said two-mode elliptical core optical fiber;
    means for adjusting the wavelength of said source of coherent light;
    detector means;
    means for directing light from said two-mode elliptical core optical fiber to said detector means;
    said detector means detecting the accumulated phase difference between light travelling along the two modes of said two-mode elliptical core optical fiber;
    whereby, to determine the presence and location of damage resulting from the damage inducing impact.

2. A system as defined in claim 1 wherein said two-mode elliptical core optical fiber has a first end and a second end;
    a single-mode polarization maintaining optical fiber connected, at a first end thereof, to said first end of said two-mode elliptical core optical fiber by a misaligned splicing joint, said single-mode polarization maintaining optical fiber also having a second end;
    a single-mode optical fiber connected, at a first end thereof, to the second end of said two-mode elliptical core optical fiber, said single-mode optical fiber also having a second end;
    the second end of said single-mode polarization maintaining optical fiber being connected to said source of coherent light;
    said second end of said single-mode optical fiber being connected to said detector means.

3. A system as defined in claim 1 wherein said two-mode elliptical core fiber has a first end and a second end;
    an in-line polarizer being formed along said elliptical core fiber;
    said second end of said two-mode elliptical core fiber comprising a mirrored surface;
    said first end of said two-mode elliptical core fiber being connected to a single-mode optical fiber by a misaligned splicing joint.

4. A system as defined in claim 3 wherein said in-line polarizer of said two-mode elliptical core optical fiber comprises an etching coated with an aluminum coating.

5. A system as defined in claim 4 wherein the second end of said single-mode optical fiber is connected to a single-mode coupler;
    a second single-mode optical fiber having a first end and a second end, the first end of said second single-mode optical fiber being connected to said single-mode coupler, the second end of said single-mode optical fiber being connected to an optical coupler, said optical coupler comprising a third single-mode optical fiber and a fourth single-mode optical fiber, said third and fourth single-mode optical fibers each having a first end connected to said second end of said second single-mode optical fiber;
    said second end of said third single-mode optical fiber being connected to said source of coherent light;
    said second end of said fourth single-mode optical fiber being connected to said detector means.

6. A system as defined in claim 5 and further including:
    an isolator having an input connected to said source of coherent light and an output;
    a depolarizer having an input connected to the output of said isolator and an output, the output of said depolarizer being connected to the second end of said third single-mode optical fiber.

7. A fiber optic sensor comprising:
    a two-mode elliptical core fiber having a first end and a second end;
    an in-line polarizer being formed along said elliptical core fiber and a portion in the fiber at which the core is exposed;
    an in-line polarizer being formed by coating the exposed portion of the core with a metallic coating;
    said second end comprising a mirrored surface;
    said first end of said two-mode elliptical core fiber being connected to a first end of a single-mode optical fiber by a misaligned splicing joint.

8. A method of detecting acoustic emissions in a composite material using at least one sensor comprising a two-mode elliptical core fiber, said method comprising:
    embedding said at least one sensor in said composite material;

transmitting light from a coherent light source to said sensor;

transmitting light which has passed through said sensor to a detector;

said acoustic emissions causing changes in the characteristics of said elliptical core fiber whereby to vary the phase difference between the two modes of said elliptical core fiber;

detecting said variations in phase difference whereby to determine the nature of said acoustic emissions.

9. A method as defined in claim 8 wherein said light is transmitted through one end of said sensor and detected at the other end of said sensor.

10. A method as defined in claim 8 wherein said two-mode elliptical core fiber comprises a first end and a second end, said second end of said two-mode elliptical core fiber comprising a mirrored surface, an in-line polarizer being formed along said two-mode elliptical core fiber;

said method comprising transmitting said light through said first end of said two-mode elliptical core fiber and detecting said light at said first end of said two-mode elliptical core fiber.

* * * * *

UNITED STATES PATENT AND TRADEMARK OFFICE
CERTIFICATE OF CORRECTION

PATENT NO. : 5,072,110
DATED : Dec. 10, 1991
INVENTOR(S) : Zhuo J. Lu, Franz A. Blaha It is certified that error appears in the above-identified patent and that said Letters Patent is hereby corrected as shown below:

| | |
|---|---|
| In the Abstract, line 4 | Delete "optpical" and insert therefore -- optical --. |
| Col. 4, Row 8 | Delete "sensitivy" and insert therefore-- sensitivity --. |
| Col. 4, Row 31 | The equation (5) should read: |

$$-- \quad d\phi_o = -\phi_o \frac{d\lambda}{\lambda} \quad --.$$

Signed and Sealed this

Fifteenth Day of June, 1993

Attest:

MICHAEL K. KIRK

*Attesting Officer*     *Acting Commissioner of Patents and Trademarks*